United States Patent [19]

Dunkle

[11] Patent Number: 5,549,317
[45] Date of Patent: Aug. 27, 1996

[54] FOLDABLE HAND TRUCK APPARATUS

[75] Inventor: Gary L. Dunkle, Connersville, Ind.

[73] Assignee: Harper Truck, Inc, Wichita, Kans.

[21] Appl. No.: 319,161

[22] Filed: Oct. 6, 1994

[51] Int. Cl.$^6$ ........................................... B62B 1/12
[52] U.S. Cl. ..................... 280/652; 280/655; 280/654; 280/47.19; 280/47.28
[58] Field of Search ....................... 280/639, 651, 280/652, 655, 655.1, 654, 47.18, 47.19, 47.23, 47.27, 47.28, 47.29, 47.375; 16/115

[56] References Cited

U.S. PATENT DOCUMENTS

| | | | |
|---|---|---|---|
| 2,490,189 | 12/1949 | Alexander | 280/47.27 |
| 2,578,409 | 12/1951 | Evans et al. | 280/47.19 |
| 2,883,207 | 4/1959 | Reich | 280/655.1 |
| 3,079,168 | 2/1963 | Monroe et al. | 280/47.27 |
| 3,112,042 | 11/1963 | Leshner | 280/651 |
| 3,788,659 | 1/1974 | Allen | 280/654 |
| 3,998,476 | 12/1976 | Kazmark | 280/655 |
| 4,185,853 | 1/1980 | Thurmond, Jr. | 280/652 |
| 4,284,287 | 8/1981 | Esposito | 280/655 |
| 4,294,463 | 10/1981 | Kotani | 280/47.29 |
| 4,478,429 | 10/1984 | Adams | 280/655 |
| 4,506,897 | 3/1985 | Libit | 280/639 |
| 4,523,773 | 6/1985 | Holtz | 280/654 |
| 4,537,421 | 8/1985 | Teachont | 280/654 |
| 4,614,349 | 9/1986 | Wenzel | 280/47.29 |
| 4,679,817 | 7/1987 | Schufer | 280/47.27 |
| 4,756,540 | 7/1988 | Crawford | 280/47.28 |
| 4,896,897 | 1/1990 | Wilhelm | 280/47.29 |
| 5,249,438 | 10/1993 | Rhaney et al. | 280/655 |

*Primary Examiner*—Kevin Hurley
*Assistant Examiner*—Min Yu
*Attorney, Agent, or Firm*—Phillip A. Rein

[57] ABSTRACT

A foldable hand truck apparatus having 1) a main support frame assembly; 2) a support wheel assembly connected to the main support frame assembly which resembles a conventional hand truck structure; 3) an extendable handle assembly having a handle support tube which is anchored to the main support frame assembly; and 4) a dual foldable load assembly pivotally connected to the main support frame assembly. The extendable handle assembly includes a handle member telescopingly mounted within the handle support tube and movable from a compact storage position laterally of the handle support tube to a locked usage position. The dual foldable load assembly includes a luggage or large article support frame and a load support plate, both pivotally connected to a lower portion of the main support frame assembly. The load support plate is first pivotal to a position 90 degrees perpendicular to the main support frame assembly for carrying smaller loads thereon or gripping an edge portion of an article to be moved. The luggage or large article support frame is pivotal to a position parallel to the load support plate and similarly perpendicular to the main support frame assembly for carrying articles of larger width than can be carried on the load support plate.

9 Claims, 4 Drawing Sheets

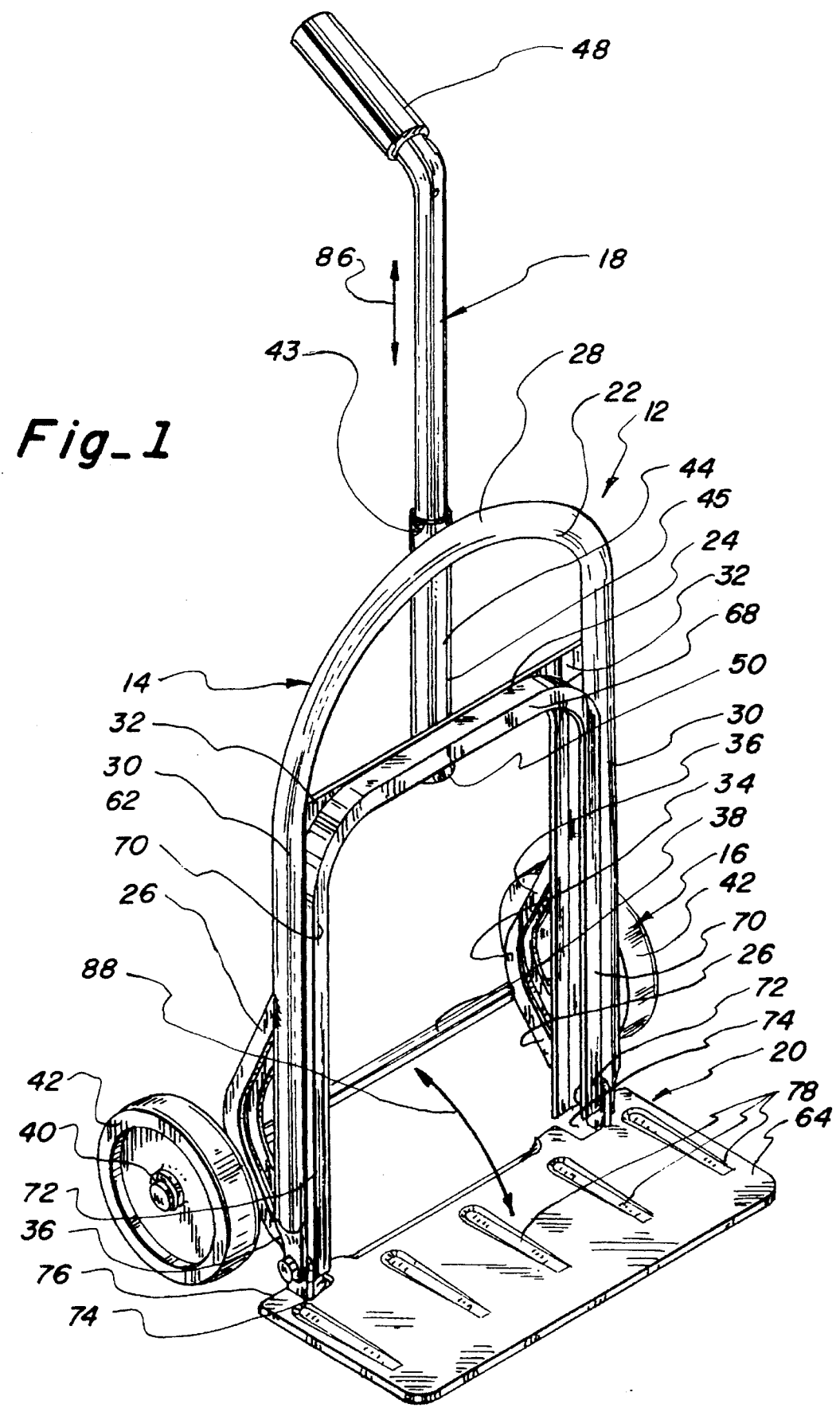
Fig_1

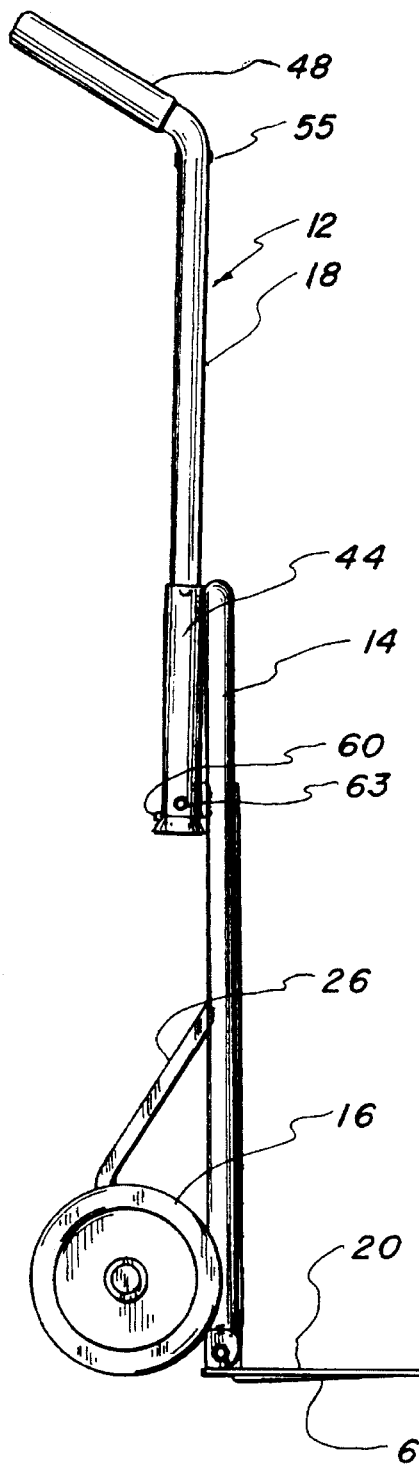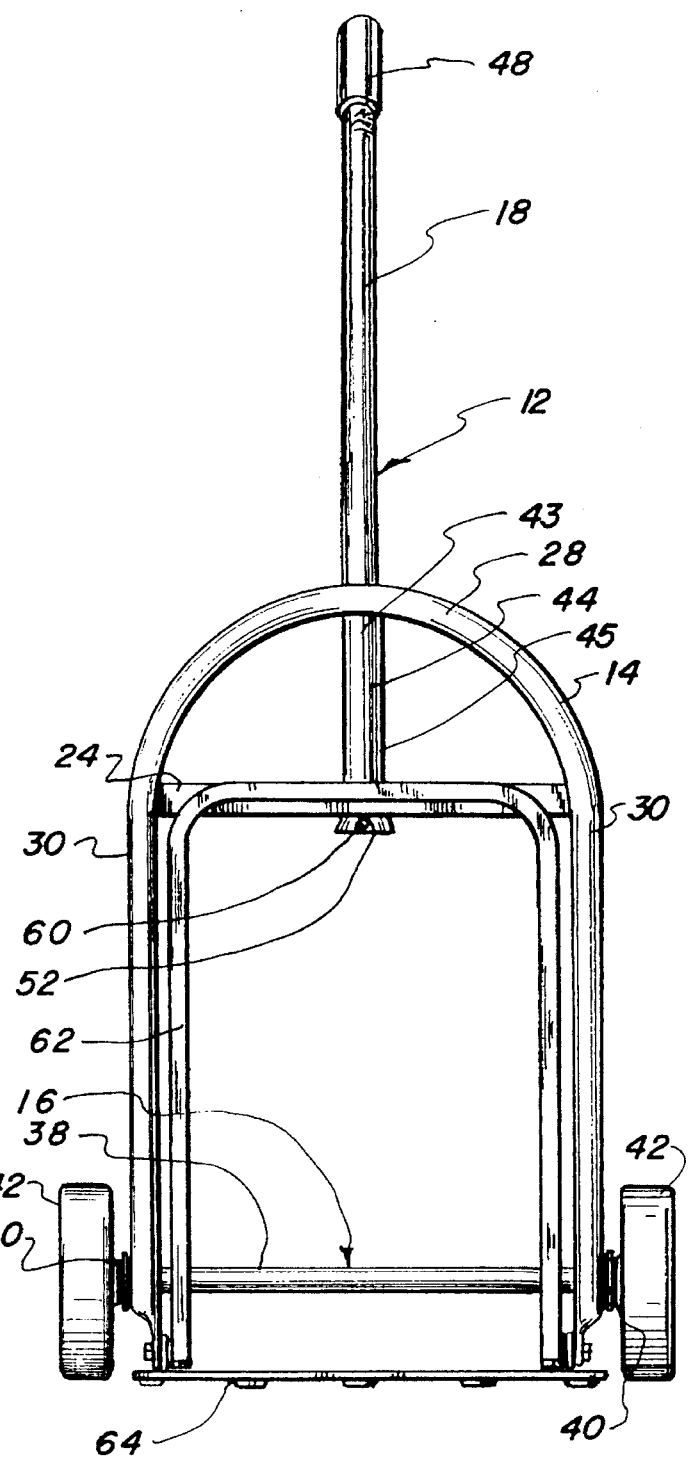
Fig_2  Fig_3

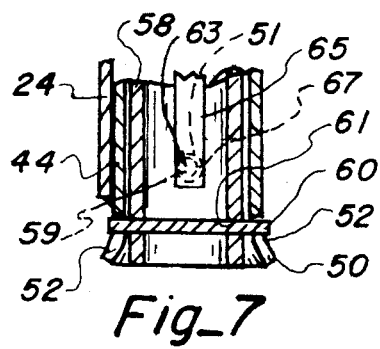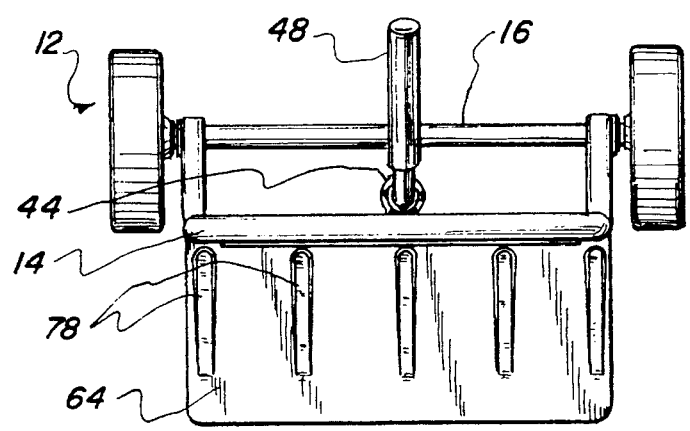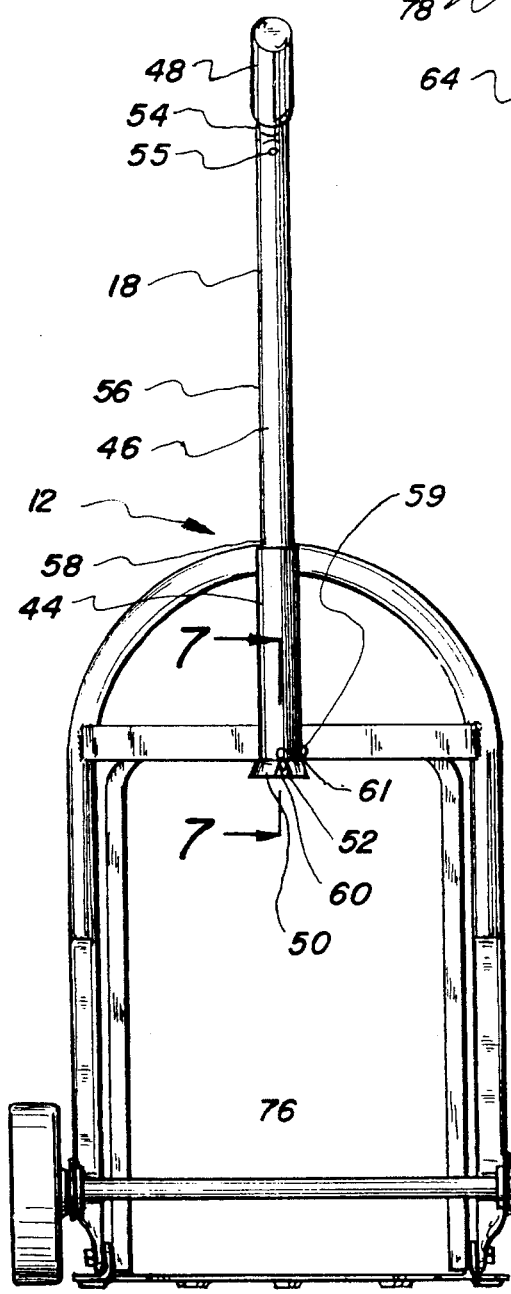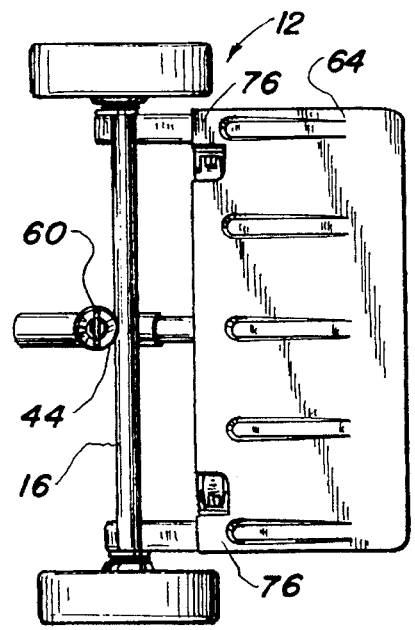

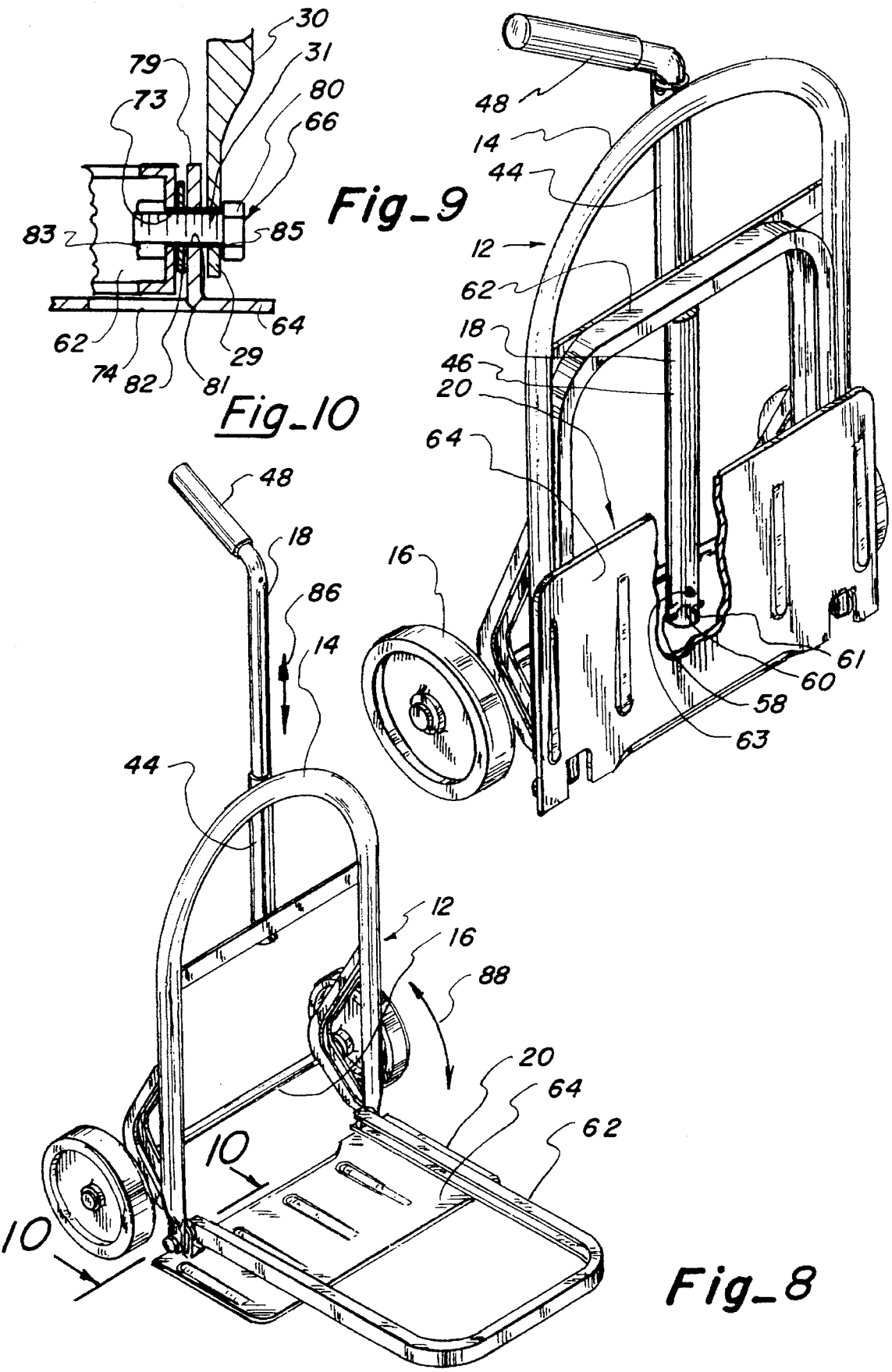

FOLDABLE HAND TRUCK APPARATUS

PRIOR ART

A patent search was not conducted on this invention. The applicant has filed a U.S. Pat. No. D 354,601, filed Aug. 2, 1993 on this invention entitled "Foldable Hand Truck Assembly". The subject design application has been allowed.

PREFERRED EMBODIMENT OF THE INVENTION

In one preferred embodiment of this invention, a foldable hand truck apparatus is provided including 1) a main support frame assembly; 2) a support wheel assembly connected to the main support frame assembly; 3) an extendable handle assembly connected to the main support frame assembly; and 4) a dual foldable lead assembly connected to a portion of the main support frame assembly.

The main support frame assembly includes 1) a main support tube of U-shape; 2) a transverse strut member connected to the main support tube to add rigidity; and 3) a pair of wheel support struts of C-shape connected to the main support tube. The main support tube has an upper arcuate section having connected thereto spaced parallel leg sections.

The wheel support struts are of C-shape connected to a lower portion of the respective parallel leg sections being in spaced parallel relationship to receive and support the support wheel assembly thereon.

The support wheel assembly is of a conventional nature having a support axle member secured as by welding or the like to the wheel support struts and having, on the outer end thereof, bearing members and support wheel members which are rotatable about respective outer ends of the support axle member.

The extendable handle assembly includes 1) a handle support tube secured between the upper arcuate section of the main support tube and a central portion of the transverse strut member of the main support frame assembly; 2) a handle member telescopingly mounted within the handle support tube; and 3) a handle cover connected to an upper outer portion of the handle member.

The handle support tube has an upper portion which is secured to the upper arcuate section of the main support frame assembly and a lower portion which is secured as by welding to the transverse strut member. The lower portion of the handle support tube is provided with an outwardly flared end section having a detent hole and a pair of cooperating alignment grooves therein.

The handle member is provided with a hand grip section which is integral with a main body section which, in turn, is integral with an alignment lock section.

The hand grip section is adapted to receive the handle cover thereon and is provided with a transverse abutment member to limit the downward movement of the handle member in a released condition. More particularly, the abutment member will engage an upper, outer surface of an upper portion of the handle support tube to prevent further downward movement thereof.

The alignment lock section is provided with a guide pin member extended through a pair of aligned pin holes and having a detent member operable to be placed in the detent hole in the handle support tube when in an extended usage position as will be noted.

The detent member includes a semi-circular head section connected to a spring member of V-shape which is snapped into the tubular alignment lock section of the handle member. The spring member biases the head section to be moved inwardly and outwardly of the detent hole in the handle support tube.

The dual foldable load assembly includes a luggage or large article support frame and a load support plate which are interconnected by a connector member or means to the main support tube of the main support frame assembly for selective pivotal movement as will be explained.

The luggage support frame is of generally U-shape having a central tube section with integral outer parallel tube leg sections. A lower portion of each parallel tube leg section is provided with a clamped connector portion having aligned anchor holes therethrough.

The load support plate is provided with 1) spaced pivotal cut-out slots; 2) a pivot abutment section; 3) reinforcement indentations; and 4) connector lugs, The pivot cut-out slots permit pivotal movement of the luggage support frame from a storage position to a usage position extended adjacent and parallel to the load support plate.

The connector lugs are formed from the material of the respective pivot cut-out slots having been bent 90 degrees from the load support plate and having connector holes therein.

The connector means is provided with a combination of a pair of a nut and bolt member and a washer member. On a lower connector portion on each of the parallel leg sections, a nut and bolt member is extended through aligned ones of 1) the anchor hole in the main support tube of the main support frame assembly; 2) the connector hole in the in the respective connector lug; and 3) the anchor hole in the connector portion of the parallel tube leg section in the luggage support frame.

The luggage support frame and the load support plate are individually moved from a storage position adjacent the main support frame assembly to usage positions extended perpendicular thereto for use either as carrying a load on the load support plate or having a greater support surface with the luggage support frame for carrying larger items such as boxes, suitcases, and the like.

OBJECTS OF THE INVENTION

One object of this invention is to provide a foldable hand truck apparatus having a main support frame assembly connected to a support wheel assembly to present a normal hand truck structure but, further, having an extendable handle assembly which can be moved from a collapsed storage position to an extended locked position and a dual foldable load assembly having a luggage support frame and a load support plate which are independently movable from a collapsed storage position to a position outwardly of the main support frame assembly for a dual purpose carrying feature.

Another object of this invention is to provide a foldable hand truck apparatus having a conventionally appearing hand truck structure but further including a dual foldable load assembly having a load support plate which can be pivoted outwardly for moving objects, such as refrigerators and the like, and having a luggage or large article support frame pivotable outwardly after movement of the load support plate to provide a larger area for carrying such items as cardboard boxes, luggage, and the like.

One other object of this invention is to provide a foldable hand truck apparatus having a dual load carrying function with a conventional load support plate and a large article support frame and being operable to collapse an extendable handle assembly and the dual foldable load assembly into a compact condition for easy storage or conveyance in a vehicle.

Still, one other object of this invention is to provide a foldable hand truck apparatus which is operable to present a dual load carrying function; economical to manufacture; collapsible into a small compact condition for easy storage and conveyance; of lightweight construction; and substantially maintenance free.

Various other objects, advantages, and features of the invention will become apparent to those skilled in the art from the following discussion, taken in conjunction with the accompanying drawings, in which:

FIGURES OF THE INVENTION

FIG. 1 is a perspective view of the foldable hand truck apparatus of this invention illustrating one usage position thereof;

FIG. 2 is a side elevational view of the foldable hand truck apparatus;

FIG. 3 is a front elevational view thereof;

FIG. 4 is a rear elevational view thereof;

FIG. 5 is a top plan view thereof;

FIG. 6 is a bottom plan view thereof;

FIG. 7 is an enlarged fragmentary sectional view taken along line 7—7 in FIG. 4;

FIG. 8 is a perspective view similar to FIG. 1 illustrating another load carrying feature thereof;

FIG. 9 is a view similar to FIG. 1 illustrating the foldable hand truck apparatus in a compact, folded condition; and FIG. 10 is an enlarged fragmentary sectional view taken along line 10—10 in FIG. 8.

The following is a discussion and description of preferred specific embodiments of the foldable hand truck apparatus of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

On referring to the drawings in detail, and in particular to FIG. 1, a foldable hand truck apparatus of this invention, indicated generally at 12, includes 1) a main support frame assembly 14; 2) a support wheel assembly 16 connected to the main support frame assembly 14; 3) an extendable handle assembly 18 connected to the main support frame assembly 14; and 4) a dual foldable load assembly 20 being pivotally connected to the main support frame assembly 14.

The main support frame assembly 14 includes 1) a main support tube 22 of U-shape; 2) a transverse strut member 24 secured to the main support tube 22; and 3) a pair of parallel spaced wheel support struts 26.

The main support tube 22 has an central upper arcuate section 28 integral on opposite outer ends with parallel leg sections 30. Each parallel leg section 30 is provided at a lower end with a lower connector portion 29 and having an aligned anchor hole 31 therein.

The lower connector portions 29 have been pinched inwardly to provide strength and for connecting to the dual foldable load assembly 20 as will be described.

The transverse strut member 24 has outer connector end sections 32 for securing, preferably as by welding, to the upper portions of the parallel leg sections 30.

The wheel support struts 26 are of generally C-shape, each having a main body section 34 integral at each outer end to a respective connector end section 36.

Each connector end section 36 is secured to a respective rear portion of the parallel leg sections 30 of the main support tube 22 as by welding or the like.

The support wheel assembly 16 is of a generally conventional nature having a support axle or shaft member 38 having, at each outer end thereof, a bearing member 40 having a respective support wheel member 42 mounted thereon. The support wheel members 42 rotate about the respective bearing members 40 and support axle member 38 in a conventional manner.

Outer end portions of the support axle member 38 are secured as by welding to respective main body sections 34 of the wheel support struts 26.

The extendable handle assembly 18 includes 1) a handle support tube 44 which is secured as by welding to the main support frame assembly 14; 2) a handle member 46 which is telescopingly mounted in the handle support tube 44 for movement from a storage to a usage position; and 3) a handle cover member 48 mounted on an upper portion of the handle member 46.

The handle support tube 44 is provided with 1) an upper portion 43 which is welded to the upper arcuate section 28 of the main support tube 22; and 2) a lower portion 45 which is secured as by welding to a central portion of the transverse strut member 24.

The lower portion 45 of the handle support tube 44 is provided with an outwardly flared end section 50 and an adjacent detent hole 51 therein. The detent hole 51 is operable to hold the handle member 46 in a locked extended position in cooperation with a detent member as will be explained.

The flared end section 50 is provided with diametrically opposed alignment grooves or slots 52 being of generally V-shape operable to guide the handle member 46 when moved to an extended or usage position in a manner to be explained.

As shown in FIG. 4, the handle member 46 includes a hand grip section 54 which is integral with a main body section 56 which, in turn, is integral with an alignment lock section 58. The hand grip section 54 is inclined laterally of the main body section 56 so as to be parallel to a support surface when tilted rearwardly to transport a load carried on the dual foldable load assembly 20.

The hand grip section 54 includes aligned holes having an abutment member 55 mounted therein. The abutment member 55 is operable to limit downward movement of the handle member 46 when presented in a folded compact condition.

The alignment lock section 58 is provided with a guide pin member 60 extended through aligned pin holes 61 and a detent member 63 having a portion selectively engagable with the detent hole 51 in the flared end section 50.

The detent member 63 includes a semi-circular head section 59 which is connected to a spring member 65 and mounted in a detent hole 67 to an outer end of the alignment lock section 58. The head section 59 extends through the detent holes 51 and 67 and is biased outwardly by the leaf spring member 65.

The handle cover 48 resembles a conventional bicycle handle grip and is mounted on the inclined portion of the hand grip section 54 of the handle member 46.

As shown in FIG. 1, the dual foldable load assembly 20 includes 1) a luggage or large article support frame 62; 2) a load support plate 64; and 3) a connector member or means 66 operable to interconnect adjacent portions of the luggage or large article support frame 62 and the load support plate 64 to the lower connector portion 29 of the main support tube 22.

The luggage or large article support frame 62 is of a generally U-shape including a central tube section 68 having outer ends secured to respective parallel tube leg sections 70. Each parallel tube leg section 70 is provided with a lower connector portion 72 having an anchor hole 73 therein.

The load support plate 64 is of a rectangular shape and provided with 1) a pair of spaced pivot cut-out slots 74; 2) a pivot abutment section 76 positioned adjacent and outwardly of respective ones of the pivot cut-out slots 74; 3) a plurality of reinforcement indentations 78; and 4) a pair of connector lugs 79, each positioned adjacent and outwardly of respective ones of the pivot cut-out slots 74.

The pivot cut-out slots 74 provide a dual purpose, namely, allowing for pivotal movement of the luggage or large article support frame 62 and providing the material to form the respective connector lugs 79.

The connector lugs 79 are each provided with a connector hole 81 operable to receive the connector means 66 therein in the assembled condition. The connector means 66 includes a pair of nut and bolt members 80 (nut member 81 and bolt member 83) each associated with a washer member 82.

As noted in FIG. 10, the connector means 66 has a nut and bolt member 80 on each lower side of the main support tube 22 extended through 1) the anchor hole 31 in the parallel leg sections 30 of the main support tube 22; 2) the connector hole 81 in the connector lug 79; 3) the washer member 82 placed adjacent the connector lug 79; 4) the anchor hole 73 in the connector connector portion 72 of the parallel tube leg section 70; and 5) the nut member 81 mounted on an outer end of the bolt member 83.

USE AND OPERATION OF THE INVENTION

In the use and operation of the foldable hand truck apparatus 12 of this invention, refer to FIG. 9 showing the structure in the compact folded position. The luggage or large article support frame 62 and the load support plate 64 have both been pivotal about the connector means 66 to the subject compact folded condition adjacent the main support frame assembly 14.

Additionally, the extendable handle assembly 18, and more particularly the handle member 46, is placed in the compact folded condition inwardly of within the handle support tube 44.

On movement of the handle member 46 to the storage position of FIG. 9, the abutment member 55 contacts an upper portion 43 of the handle support tube 44 to limit downward movement thereof. Additionally, the curved portion of the hand grip section 54 would prevent downward movement but the abutment member 55 can be constructed of a plastic material so as to not mar the finished condition of the hand grip section 54.

Further, it is noted in the compact storage or folded position that the handle member 46 has been rotated substantially 90 degrees from the usage position of FIG. 1. This achieves the overall compact folded position structure having a width not greater than the outer surface of the load support plate 64 and the rearmost surface of the support wheel members 42.

On proceeding to use the foldable hand truck apparatus 12 with the load support plate 64 as noted in FIG. 1, the handle member 46 is grasped, rotated 90 degrees, and moved longitudinally within the handle support tube 44.

On moving the handle member 46 upwardly as noted by an arrow 86 in FIG. 1, the guide pin member 60 is moved upwardly and into the alignment groove 52 in the flared end section 50 of the handle support tube 44. This V-shaped alignment groove 52 operates to rotate the handle member 46 into the precise desired position which automatically places the head section 59 of the detent member 63 into the detent hole 51 in the handle support tube 44.

On reaching this fully extended position of the handle member 46 after being guided by the alignment grooves 52, the handle member 46 locks in the fully extended rigid usage position.

The operator would then pivot the load support plate 64 downwardly, as noted by an arrow 88 in FIG. 1, for this first usage position.

Next, the operator can move to the usage position of FIG. 8 by pivoting the luggage or large article support frame 62 downwardly as noted by arrow 88 in FIG. 8.

In the condition of FIG. 8, the upper surface of the luggage or large article support frame 62 allows items such as cardboard boxes, luggage, and the like to be placed and readily carried thereon.

In the usage position of FIG. 1, it is noted that the load support plate 64 can be utilized to be placed underneath smaller items such as narrow cartons, refrigerators, and the like for assistance in moving and transporting these articles.

After usage of the foldable hand truck apparatus 12, it is obvious that the luggage or large article support frame 62 and the load support plate 64 can be pivoted upwardly, as noted by arrow 88 in FIG. 8, to the position as shown in FIG. 9.

Next, the operator would press inwardly on the detent member 63 to clear the detent hole 51 in the handle support tube 44 which then allows the handle member 46 to be moved downwardly as noted by arrow 86 in FIG. 1.

In the collapsed position of FIG. 9, it is obvious that the foldable hand truck apparatus 12 can be readily transported by grasping the upper arcuate section 28 of the main support tube 22.

Further, the upper arcuate section 28 can be utilized for hanging on a support member on a wall in a person's garage or other storage areas.

In the compact folded position of FIG. 9, it is obvious that the foldable hand truck apparatus it can be readily transported in a trunk area of an automobile as does'nt have an elongated and rigid width found on conventional hand truck structures.

The foldable hand truck apparatus is lightweight in construction; easily transported; foldable into a compact storage position; selectively operable with a load support plate or a large article support frame to selectively receive and convey articles therewith; provided with a handle assembly having a handle member movable from a compact storage position to an extended load usage position; and substantially maintenance free.

While the invention has been described in conjunction with preferred specific embodiments thereof, it will be understood that this description is intended to illustrate and not to limit the scope of the invention, which is defined by the following claims:

I claim:

1. A foldable hand apparatus, comprising:
   a) a main support frame assembly;
   b) a support wheel assembly connected to said main support frame assembly;
   c) an extendable handle assembly including a handle support tube connected to said main support frame assembly and a handle member telescopingly mounted in said handle support tube;
   d) said handle member movable from a first collapsed position substantially within confines of said main support frame assembly to a second usage position extending above said main support frame assembly;
   e) a dual foldable load assembly pivotally connected to said main support frame assembly selectively movable from a collapsed storage position to a usage position laterally of said main support frame assembly;
   f) said handle support tube includes a lower flared end section having an alignment groove;
   g) said handle member includes a guide pin member extended laterally therefrom; and
   h) said guide pin member selectively positioned in said alignment groove to place said handle member in a proper usage position when in said second usage position.

2. A foldable hand truck apparatus as described claim 1, wherein:
   a) said flared end section having a pair of diametrically opposed alignment grooves;
   b) said guide pin member extended laterally out of opposite sides of said handle member; and
   c) said guide pin member positioned in both of said alignment grooves to prevent rotation of said handle member when in said second usage position.

3. A foldable hand truck apparatus as described in claim 1, wherein:
   a) a lower portion of said handle support tube having a detent hole; and
   b) said handle member includes a detent member mounted in said detent hole when said handle member is extended to the usage position;
   whereby said handle member is prevented from rotational and axial movement.

4. A foldable hand truck apparatus as described in claim 1, wherein:
   a) said handle member includes a hand grip section connected to and extended laterally of a main body section; and
   b) said handle member rotatable within said handle support tube to place said hand grip section adjacent and parallel to said main support frame assembly when in the first collapsed position;
   whereby reduced space is required for conveyance and storage of said foldable hand truck apparatus.

5. A foldable hand truck apparatus as described in claim 4, wherein:
   a) said dual foldable load assembly moved to the collapsed storage position adjacent said main support frame assembly to present a hand truck of collapsed height and width so as to be easily conveyed in a trunk of an automobile.

6. A foldable hand truck apparatus, comprising:
   a) a main support frame assembly;
   b) a support wheel assembly connected to said main support frame assembly;
   c) an extendable handle assembly including a handle support tube connected to said main support frame assembly and a handle member telescopingly mounted in said handle support tube;
   d) said handle member including a lock means movable from a first collapsed position within confines of said main support frame assembly to a second usage position extending above said main support frame assembly;
   e) said handle support tube includes a lower flared end section having an alignment groove; and
   f) said handle member includes a guide pin member extended laterally therefrom.

7. A foldable hand truck apparatus as described in claim 6, wherein:
   a) said flared end section having a pair of diametrically opposed alignment grooves;
   b) said guide pin member extended laterally out of opposite sides of said handle member; and
   c) said guide pin member positioned in both of said alignment grooves to prevent rotation of said handle member when in said second usage position.

8. A foldable hand truck apparatus, comprising:
   a) a main support frame assembly;
   b) a support wheel assembly connected to said main support frame assembly;
   c) an extendable handle assembly including a handle support tube connected to said main support frame assembly and a handle member telescopingly mounted in said handle support tube;
   d) said handle member movable from a first collapsed position within confines of said main support frame assembly to a second usage position extending above said main support frame assembly;
   e) lock means on said handle member and said handle support tube engagable to lock said handle member in a proper usage position when in said second usage position;
   f) guide means having an alignment groove on said handle support tube and guide pin on said handle member; and
   g) said guide pin member positioned in said alignment groove to place said handle member in said second usage position.

9. A foldable hand truck apparatus as described in claim 8, wherein:
   a) said handle support tube includes a lower flared end section having said alignment groove therein; and
   d) said guide pin member positioned in said alignment groove in said flared end section to place in said second usage position.

* * * * *